Nov. 30, 1943.  T. B. MONTGOMERY ET AL  2,335,784

REGULATING SYSTEM

Filed Nov. 17, 1941

Inventors
T. B. Montgomery
J. F. Sellers
W. M. Pickslay
by Harold A. Silver
Attorney Patented Nov. 30, 1943

2,335,784

UNITED STATES PATENT OFFICE 2,335,784

REGULATING SYSTEM

Terryl B. Montgomery, Wauwatosa, and John F. Sellers and William M. Pickslay, Milwaukee, Wis., assignors to Allis-Chalmers Manufacturing Company, Milwaukee, Wis., a corporation of Delaware Application November 17, 1941, Serial No. 419,448

8 Claims. (Cl. 171—223)

This invention relates in general to control systems for dynamo-electric machines utilized to maintain an electrically measurable quantity in accordance with a predetermined function. In particular this invention relates to a control system for regulating the field current in a dynamo-electric machine of the above type to regulate a characteristic thereof by control of an exciter energizing such field circuit.

Regulators of the solenoid type can be made accurate, sensitive and fast acting, but only at the expense of ruggedness, simplicity and cheapness. Dynamo-electric machines have been utilized as regulators and as such are rugged and have a long, maintenance-free life, but are not sensitive, fast and accurate. Where dynamo-electric machines are used to regulate by varying the field resistance thereof, they are subject to inaccuracies caused by varying load currents, varying field winding temperatures, and other inherent characteristics such as are due to armature reaction, residual flux and the like.

It is therefore a general object of this invention to provide a system for regulating an electrically measurable quantity utilizing a dynamo-electric machine as a regulator that is sensitive, fast and accurate as well as rugged, long-lived and cheap to manufacture.

In prior art control systems utilizing an exciting generator to regulate an electrically measurable characteristic of a dynamo-electric machine, the terminal voltage of the exciting generator has been controlled to regulate the field current of the dynamo-electric machine. Such control of the terminal voltage of the exciting generator to effect a regulation, has been caused by a change in the generator excitation ampere turns, effected by or accompanied by a change in the resistance of the exciter field circuit.

The ideal regulation of an exciter in a control system of the above type, includes the supply at all times of just sufficient excitation to the exciting generator so that the terminal voltage thereof will produce a current in the circuit of the dynamo-electric machine of a value to give the desired characteristic. As the terminal voltage of the exciter may have any of a number of values in order to maintain the desired characteristic, it has long been a problem to provide a means of controlling the exciting generator so that it will inherently provide the desired terminal voltage at various values thereof. When an attempt was made to solve this problem by utilizing the unstable voltage condition of a series field excited generator, it was found to be inaccurate and impractical for it would be necessary to change the number of turns in the series field for each changed value of regulated quantity desired. When attempts were made to control such excitation by change in field resistance, errors due to field winding temperature and due to exciter load current were evident.

The present invention has as its object a solution of the above problem whereby an inherently rugged and maintenance-free dynamo-electric machine can be utilized as a regulator having a high sensitivity, accuracy and speed of response.

It is also an object of this invention to provide a regulating exciter with an inherently regulated field excitation just sufficient to maintain its terminal voltage at any desired value to which it may be changed by a correcting means.

It is a further object of this invention to provide a system for controlling an electrical device, the operation of which is measured by an electrically measurable quantity, in accordance with a predetermined function by means of a regulating generator having a constant resistance shunt connected field circuit of a resistance value such that a constant ratio of field ampere turns to generator terminal volts is maintained.

It is a further object of this invention to provide a regulating exciter with characteristics whereby it is stable, accurate, sensitive and fast acting.

It is also an object of this invention to provide a regulating exciter having a substantially straight line saturation curve with a field resistance line substantially coinciding with such saturation curve.

Objects and advantages other than those above set forth will be appparent to those skilled in the art when read in connection with the accompanying drawing, in which.

Figure 1:
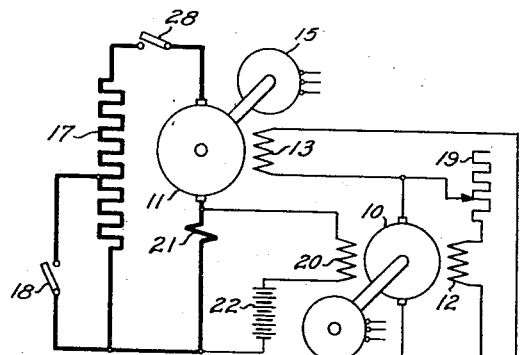
Fig. 1 is a cricuit diagram of connections of a control system embodying the present invention.

In the control system of Fig. 1 an embodiment of the invention is shown in which a dynamo-electric machine, shown as a generator 11, has a field 13 energized by an exciting generator 10. In order to maintain the armature current thereof at a constant value, the generator 11 and exciter 10 are driven at constant speeds by alternating current motors, shown as 15 and 16, respectively. Generator 11 supplies a load 17 which may be changed, for example, by operation of the switches 18 and 23.

The control of the armature current of the machine 11 is effected in general by controlling the terminal voltage of the exciter 10 in accordance with any change in such armature current. The control exciter 10 has a shunt field winding 12 and the resistance of the shunt field winding circuit may be varied by the adjustable resistance 19. A control field 20 is connected responsively to change in armature current of the machine 11 by being connected across a shunt, shown as the interpole winding 21, in series with and in opposition to a source of reference voltage shown as a battery 22. When the armature current of the machine 11 is at its desired value, the voltage across the interpole winding 21 is equal to and opposes the voltage of battery 22 and no current flows in the control field 20.

Figure 3:
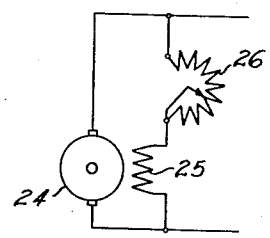

In order to more clearly understand the operation of the control exciter 10, it is desirable first to consider the control operation, by means of field resistance variation, of a conventional direct current generator 24 such as is shown in Fig. 3. This generator 24 has a field winding 25 the current of which may be manually controlled by an adjustable resistor 26.

Figure 4:
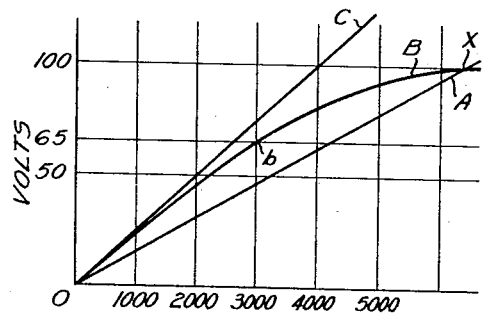
Figs. 3 and 4 are illustrations of a prior art control circuit and the characteristic curves of the machine there controlled.

In Fig. 4, the characteristic curves of the machine 24 are shown. The curve OB is the saturation or magnetization curve showing the relationship between field ampere turns and the electromotive force induced thereby. As the speed of machine 24 is assumed to be constant, the curve OB will also show the relationship between field ampere turns and generator terminal volts. The line OA is the field resistance line or field volt-ampere line of the machine 24 and illustrates the relationship between the voltage impressed on the circuit of field 25 and the ampere turns of excitation produced thereby.

When the field circuit is closed, with the generator being driven at the assumed constant speed, the voltage builds up in the conventional manner to 100 volts, the point $x$ at which the field resistance line OA and the magnetization curve OB intersect. For example, if the current in field 25 is such that 3000 ampere turns excitation are provided, from curve OB we find that a terminal voltage of 65 volts is produced. However, from line OA, we find that 65 volts will produce an excitation of about 4100 ampere turns. Thus the terminal voltage is further increased so that it is finally built up to the point at which the field resistance line OA and the magnetization curve OB meet. At this point the terminal voltage of the machine 24, when applied to the field 25, will produce just sufficient ampere turns to maintain the terminal voltage at this point, which is 100 volts.

As is well known, the angle formed by field resistance line OA and the horizontal axis is determined by the amount of resistance 26 included in circuit with field winding 25; a decrease in resistance 26 rotating the field resistance line OA in a clockwise direction about the point O. If the resistance 26 is increased, the field resistance line OA and the magnetization curve OB intersect at a lower value of terminal voltage, due to a counterclockwise rotation of the line OA. If the line OA is rotated to the left of the saturation curve OB, the terminal voltage will fall to zero.

If there were no saturation in the machine 24, the magnetization curve will become the straight line OC. If the resistance 26 be adjusted so that the field resistance line OA coincides with the line OC, the unstable voltage condition is obtained. Under such conditions, at any terminal voltage of the machine 24, the ampere turns provided by the field 25 are just sufficient to maintain such terminal voltage. This is true at any value of terminal voltage. If the terminal voltage of the machine 24 can be changed in some manner other than by varying the resistance of the field 25, if the saturation curve is a straight line throughout the operating range, and if the entire normal operation is provided by excitation such that the field resistance line coincides with the saturation curve, any new terminal voltage will be inherently maintained at the new value.

To obtain this functioning in the machine 10 of Fig 1, the saturation curve for such machine is made a straight line over the operating range of the exciter 10. This may be effected by increasing the proportions of the magnetic circuit thereof or in any well known manner. The resistance 19 is adjusted so that the field resistance line of the machine 10 coincides with its saturation curve and hence the ratio of field ampere turns to terminal volts is constant at 1:1 ratio. The regulating exciter 10 will therefore at any terminal voltage supply itself with field excitation just sufficient to maintain that terminal voltage.

Therefore if a change in the armature current of the machine 11 takes place, an energization of the field 20 of exciter 10 is effected which changes the total ampere turns and therefore the terminal voltage of the exciter 10. The changed terminal voltage varies the current in the field 13, returning the armature current of the machine 11 to the desired value at which field 20 is no longer energized. The excitation produced by shunt field 20 is inherently such as to give the new terminal voltage.

Figure 2:
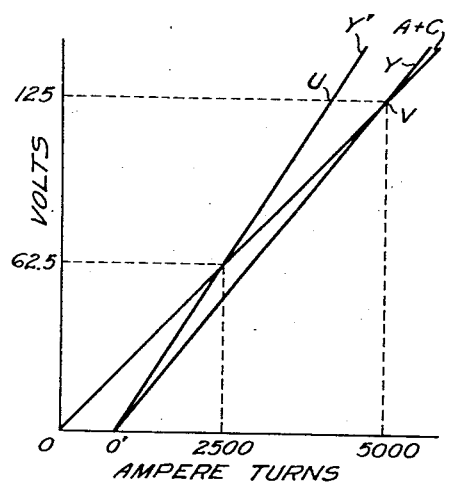
Fig. 2 depicts characteristic curves of the control exciter shown in Fig. 1.

The curves of Fig. 2 show the saturation or magnetization curve as a straight line OC and the field resistance line OA coinciding therewith. If the control field 20 were energized by the battery 22 only, the ampere turns supplied to exciter 10 would be O—O', Fig. 2.

If switches 28 and 18 are both closed, and if load 17 is such as requires 125 volts across the terminals of exciter 10 to circulate full load current, the voltage of exciter 10 will build up along the line O'Y to the point V, at which it intersects the saturation curve OC. At this point 5000 ampere turns are supplied by field 12 which gives a terminal voltage of 125 volts to exciter 10. Full load current through the interpole winding 21 produces a voltage thereacross equal to and opposing the voltage of battery 22. No ampere turns are then supplied by control field 20.

It will be noted that the corrective action and effect is proportional to the deviation from normal of the regulated quantity, as is desirable in any regulating system. As the voltage builds up along the line O'Y, the difference between O'Y and OC (the ampere turns available for causing a terminal voltage change) becomes less and less. As the current in machine 11 returns to the desired value, the ampere turns supplied by field 20 are reduced.

If with the exciter 10 supplying 125 volts to maintain full load current, the switch 18 is opened, thereby requiring only 62.5 volts across the exciter to maintain full load current, the voltage reduces along the line O'Y', inasmuch as ampere turns equal to UV opposing the field 12 are supplied by field 20. When the line O'Y' crosses the curve OC, the balance is again obtained at which the control field 20 excitation again becomes zero and the voltage of 62.5 volts provides 2500 ampere turns in field 12, which is just sufficient excitation to produce 62.5 volts on the exciter 10.

Small variations in the desired value of armature current of machine 11 are regulated in the above manner and a constant current is accurately maintained. Any direct current machine is an amplifier when its delivered output change is greater than the change of input to the field. By making the resistance of control field 20 small and by having such field consist of a large number of turns, a small change in regulated current of machine 11 will produce a large change in corrective action of exciter 10.

In the above description, the conditions of operation are those of a theoretically perfect machine. In practice, it may not be commercially feasible to have the saturation curve of machine 10 a perfectly straight line. This saturation curve may, due to hysteresis, be a narrow width band instead of a line. Residual flux in the machine 10 and armature reaction thereof may introduce further complications whereby the field resistance line may not exactly coincide with the saturation curve. The field resistance line is therefore either substantially coincident with or closely parallel to that portion of the saturation curve involved in the operating range of the exciter. The straightness of the saturation curve and errors due to hysteresis will depend upon commercial value of the accuracy desired, as an exciter with an absolutely straight saturation curve would be more expensive than an exciter having a curve sufficiently straight to be ordinary accurate.

It may therefore be desirable that the voltage of battery 22 exceeds by a small amount the voltage across interpoles 21 when the steady state current is flowing therethrough. This will permit a small current in the control field 20 even when the regulator is in balanced condition, and the saturation curve and field resistance line will be parallel or will diverge slightly. Thus any difference between the saturation curve and the field resistance line is taken up by the added ampere turns supplied by the control field 20.

It is desirable from the standpoint of accuracy that the current in the control loop be maintained at a substantially constant value for all values of current in the machine 11 at which the regulating system is in balance. The present invention permits this, for the current in control field 20 is constant at zero value or at some finite value under balanced conditions of the regulating system, independently of the voltage of machine 10 and hence the value of current in the field 13.

Figure 5:
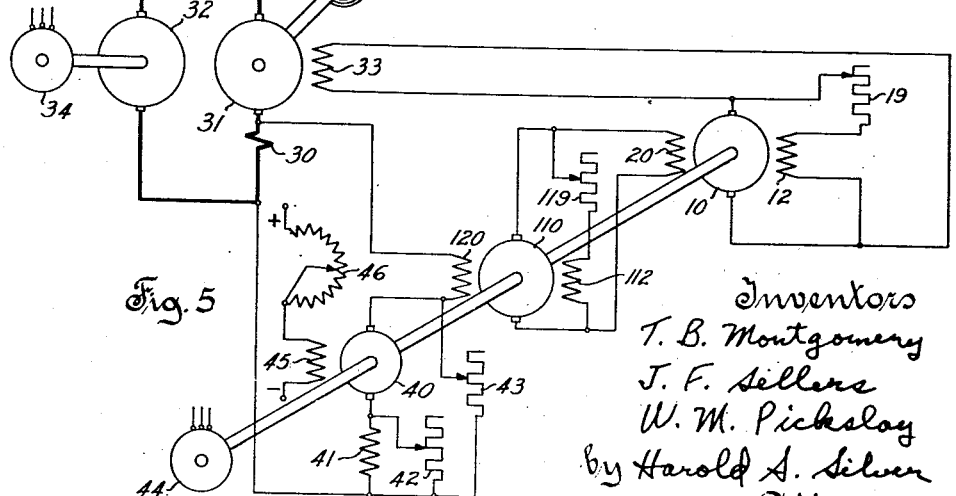
Fig. 5 is a diagram of connections of a modification of the invention shown in Fig. 1.

Fig. 5 shows an embodiment of the invention in which the dynamo-electric machine controlled by the regulating exciter 10 is shown as a motor 31 driving a reel for strip material 35. The motor 31 is shown as being supplied by a generator 32 driven by an alternating current motor 34. In order to keep the current in motor 31 at a constant value, independently of change in speed due to winding up of the strip material 35, the current in the field 33 is regulated by the regulating exciter 10.

In order to obtain increased amplification, speed of response and current carrying capacity, two regulating exciters 10 and 110 are cascaded. The exciter 10 is controlled and operates as it did in the embodiment of Fig. 1. The control field 20 of exciter 10 is controlled indirectly from the shunt 30, which may be the interpole winding of the motor 31, such control being through the second regulating exciter 110.

The regulating exciter 110 has a shunt field 112 and a resistance 119 in circuit therewith of such value that its field resistance line coincides with its saturation curve which is substantially a straight line. The control field 120 is connected across the interpole winding 30 in series with a source of voltage shown as a small direct current generator 40. The three generators 40, 110 and 10 are shown as driven at a constant speed by an alternating current motor 44. Generator 40 is the source of reference voltage, functioning similarly to the battery 22 in the control system of Fig. 1, and it has a separately excited field 45 energized from a source of direct current through an adjustable resistor 46.

If the motor 31 is winding the strip 35 onto the reel, a constant tension in the strip will be provided by maintaining a constant power input to the motor 31. With a constant voltage supplied by the generator 32, this constant tension will be maintained if a constant current in the motor circuit is maintained. As the strip is being wound on the reel and the diameter of the reeled strip increases, the motor current tends to increase thereby increasing the voltage across the interpole winding 30. This increase in voltage causes a current to flow in field 120 of regulating exciter 110 raising the voltage thereof. This raise in voltage is cascaded through the machine 10 to raise the voltage across the field 33 thereby decreasing the current and the speed of motor 31 until such current returns to the desired constant value. A constant tension on material 35 is thereby maintained.

A series field 41 is provided for the generator 40 for the purpose of compensating for the IR drop in the control loop circuit. This makes for accuracy for, as set forth in connection with the embodiment of Fig. 1, no variation of the control loop current under steady state conditions is desirable. The voltage of exciter 40, so compensated, is independent of the direction of flow of current in the control loop, and the regulating system of Fig. 5 is therefore more accurate than the system of Fig. 1 wherein the battery IR drop is added to or subtracted from the battery voltage dependent upon direction of current flow.

The exciter 40 has further advantages over a battery such as 22 in Fig. 1, in that it has a low internal resistance. The voltage of exciter 40 can be adjusted in finely divided steps by means of the adjustable resistor 46, without affecting the resistance of the control loop. The voltage of battery 22 can be changed only by adding or subtracting cells or by use of a potential divider which would add resistance to the control loop. The series field 41 flat compounds or under compounds the generator 40. This series field 41 also augments the speed of response and the accuracy of the regulating circuit. The resistors 42 and 43 are utilized to properly set the compounding provided by the field 41 and the overall resistance of the control loop circuit which must be kept as small as possible.

The machine 31 could as well be a braking generator tensioning the unwinding of the strip 35, and the control of the tension would be similar. The control of tension could as well be control of torque, speed, voltage, power, or any other electrically measurable quantity the value of which can be regulated by varying the voltage or current of an electric machine, the operation of which is measured by or reflected in the quantity.

If it is desired to regulate for some prescribed set of values other than a constant value, such regulation can be obtained by adjusting the field resistance line so that it diverges from the saturation curve in a predetermined manner. The regulator may be given a "static" characteristic and a "droop" may be given to the regulated quantity, when the field resistance line is above or to the left of the saturation curve, and a rising characteristic when below or to the right of the saturation curve. The difference in ampere turns between the two curves is supplied by the control field. In these cases the ratio of field ampere turns to terminal volts will be constant at a ratio other than a 1:1 ratio.

To overcome any lag in a change of the regulated quantity due to mechanical inertia or due to inductance, any suitable antihunting means may be supplied which will prevent overshooting of the regulating exciter.

Although several embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a control system, a dynamo-electric machine, a field winding on said dynamo-electric machine, a generator connected to supply current to said field winding, said generator operating on a substantially straight portion of the saturation curve thereof, a field winding on said generator connected in shunt with the armature thereof, means for establishing the resistance of said generator field winding circuit at a predetermined value such that the field resistance line of said generator substantially coincides with said straight portion of said saturation curve, and an auxiliary field winding on said generator connected in circuit with a voltage source variable responsively to change in a controlled characteristic of said dynamo-electric machine and connected in circuit with a reference voltage source opposed to said variable voltage source, said reference voltage source having a constant voltage independent of direction of flow of current therethrough.

2. A control exciter comprising an armature, a field winding for said exciter connected in parallel with said armature thereof, a magnetic circuit for said exciter of such proportions that the saturation curve for the normal operating voltage range of said exciter is substantially a straight line, means for establishing the resistance of said field circuit at a predetermined value such that the resistance line of said exciter substantially coincides with said straight portion of said saturation curve, and auxiliary means for adding or subtracting ampere turns to said field winding.

3. A control exciter comprising an armature, a field winding for said exciter connected in parallel with said armature thereof, a magnetic circuit for said exciter of such proportions that the relation of field ampere turns to terminal volts is substantially a straight line function over the operating range of said exciter, means for fixing the resistance of said field winding circuit to a value such that any terminal voltage of said exciter will cause current flow in said field to provide ampere turns of excitation just sufficient to maintain said terminal voltage, and an auxiliary field winding on said exciter.

4. In a control system, a dynamo-electric machine, a field winding on said dynamo-electric machine, a first generator connected to supply current to said field winding, said generator operating on a substantially straight portion of the saturation curve thereof, a field winding on said generator connected in shunt with the armature thereof, means for fixing the resistance of said generator field winding circuit at a value such that the field resistance line of said generator substantially coincides with said straight portion of said saturation curve, an auxiliary field winding on said generator, a second generator provided with characteristics similar to said first generator and connected to control said auxiliary field winding on said first generator, an auxiliary field winding on said second generator, and means connecting said last said auxiliary field winding to operate responsively to change in a controlled characteristic of said dynamo-electric machine.

5. In a control system, a dynamo-electric machine, a field winding on said dynamo-electric machine, a generator connected to supply current to said field winding, said generator operating on a substantially straight portion of the saturation curve thereof, a field winding on said generator connected in shunt with the armature thereof, means for fixing the resistance of said generator field winding circuit at a value such that the field resistance line of said generator substantially coincides with said straight portion of said saturation curve, and an auxiliary field winding on said generator connected in circuit with a voltage source variable in response to change in a controlled characteristic of said dynamo-electric machine and in circuit with a low resistance reference voltage source opposed to said variable voltage source.

6. In a control system, a dynamo-electric machine, a field winding on said dynamo-electric machine, a generator connected to supply current to said field winding, said generator operating on a substantially straight portion of the saturation curve thereof, a field winding on said generator connected in shunt with the armature thereof, means for fixing the resistance of said generator field winding circuit at a value such that the field resistance line of said generator substantially coincides with said straight portion of said saturation curve, and an auxiliary field winding on said generator connected in circuit with a voltage source variable in response to change in a controlled characteristic of said dynamo-electric machine and in circuit with a reference voltage source opposed to said variable voltage source, said reference voltage source comprising a second dynamo-electric machine, and means for flat compounding said second dynamo-electric machine.

7. In a control system, a dynamo-electric machine, a field winding on said dynamo-electric machine, a generator connected to supply current to said field winding, said generator operating on a substantially straight portion of the saturation curve thereof, a field winding on said generator connected in shunt with the armature thereof, means for fixing the resistance of said generator field winding circuit at a value such that the field resistance line of said generator substantially coincides with said straight portion of said saturation curve, and an auxiliary field winding on said generator connected in circuit with a voltage source variable in response to change in a controlled characteristic of said dynamo-electric machine and in circuit with a reference voltage source opposed to said variable voltage source, said reference source comprising a second dynamo-electric machine, and means for amplifying the response of said generator to a change in said controlled characteristics of said first dynamo-electric machine, said means comprising a series connected field on said second dynamo-electric machine.

8. In a control system, a dynamo-electric machine, a field winding on said dynamo-electric machine, a generator connected to supply current to said field winding, said generator operating on a substantially straight portion of the saturation curve thereof, a field winding on said generator connected in shunt with the armature thereof, means for establishing the resistance of said generator field winding circuit at a predetermined value such that the field resistance line of said generator substantially coincides with said straight portion of said saturation curve, and an auxiliary field winding on said generator connected in circuit with a voltage source variable in response to change in a controlled characteristic of said dynamo-electric machine and in circuit with a low resistance reference voltage source in opposed relation to said variable voltage source and adjustable in finely divided steps.

TERRYL B. MONTGOMERY.
JOHN F. SELLERS.
WILLIAM M. PICKSLAY.